(12) United States Patent
Gashgaee

(10) Patent No.: US 10,344,876 B2
(45) Date of Patent: Jul. 9, 2019

(54) OBLONG DIAPHRAGM VALVES

(71) Applicant: Entegris, Inc., Billerica, MA (US)

(72) Inventor: Iraj Gashgaee, Marlborough, MA (US)

(73) Assignee: Entegris, Inc., Billerica, MA (US)

( * ) Notice: Subject to any disclaimer, the term of this patent is extended or adjusted under 35 U.S.C. 154(b) by 0 days.

(21) Appl. No.: 15/737,963

(22) PCT Filed: Jun. 22, 2016

(86) PCT No.: PCT/US2016/038805
§ 371 (c)(1),
(2) Date: Dec. 19, 2017

(87) PCT Pub. No.: WO2016/209991
PCT Pub. Date: Dec. 29, 2016

(65) Prior Publication Data
US 2018/0299017 A1  Oct. 18, 2018

Related U.S. Application Data

(60) Provisional application No. 62/183,249, filed on Jun. 23, 2015.

(51) Int. Cl.
*F16K 7/17* (2006.01)
*F04B 7/00* (2006.01)
(Continued)

(52) U.S. Cl.
CPC .............. *F16K 7/17* (2013.01); *F04B 7/0076* (2013.01); *F04B 7/02* (2013.01); *F04B 13/00* (2013.01);
(Continued)

(58) Field of Classification Search
CPC .......... F16K 7/17; F04B 7/0076; F04B 13/00; F04B 7/02; F04B 43/04; F04B 43/0036; F04B 7/0208
(Continued)

(56) References Cited

U.S. PATENT DOCUMENTS 2,880,961 A * 4/1959 Wynn ..................... F16K 7/123
251/331
4,304,260 A * 12/1981 Turner .............. A61M 5/16809
137/613
(Continued)

FOREIGN PATENT DOCUMENTS

CN    101583796 A    11/2009
CN    102388248 A    3/2012
(Continued)

*Primary Examiner* — John Bastianelli
(74) *Attorney, Agent, or Firm* — Entegris, Inc.

(57) ABSTRACT

An oblong diaphragm valve has curved surfaces carved into faces of a body and a plate. The curved surfaces have an oblong shape and define an oval or egg-shaped valve chamber when the body and the plate are joined and secured to each other, with a diaphragm sandwiched there-between. An inlet and an outlet are defined in the curved surface of the body at opposite ends defined by a length of the valve chamber. A flow passage is defined in the curved surface of the plate and has an opening centrally located relative to the valve chamber for actuation of the diaphragm to close or open the oblong diaphragm valve with minimal or no stress, ensuring durability and longevity of the oblong diaphragm valve with increased precision, while reducing fluid waste and pressure spikes in pumping operations.

16 Claims, 8 Drawing Sheets

(51) Int. Cl.
*F04B 7/02* (2006.01)
*F04B 13/00* (2006.01)
*F04B 43/04* (2006.01)
*F04B 43/00* (2006.01)

(52) U.S. Cl.
CPC ............ *F04B 43/04* (2013.01); *F04B 7/0208* (2013.01); *F04B 43/0036* (2013.01)

(58) Field of Classification Search
USPC .............................................. 251/331, 335.2
See application file for complete search history.

(56) References Cited

U.S. PATENT DOCUMENTS

| | | | | |
|---|---|---|---|---|
| 4,376,315 | A * | 3/1983 | Badger | B64D 11/02 251/5 |
| 5,462,256 | A * | 10/1995 | Minick | A61M 5/14224 251/331 |
| 6,158,712 | A * | 12/2000 | Craig | B01L 3/502707 251/331 |
| 6,786,468 | B2 * | 9/2004 | Schroeder | F16K 31/0658 251/129.17 |
| 7,168,675 | B2 * | 1/2007 | Cabuz | F16K 31/02 251/129.01 |
| 2006/0118751 | A1 * | 6/2006 | Lodolo | F16K 7/126 251/331 |
| 2007/0128061 | A1 | 6/2007 | Gashgaee et al. | |
| 2009/0047143 | A1 | 2/2009 | Cedrone et al. | |
| 2015/0041691 | A1 * | 2/2015 | Buhler | F16K 7/126 251/129.01 |

FOREIGN PATENT DOCUMENTS

| | | |
|---|---|---|
| CN | 104467341 A | 3/2015 |
| JP | 10061556 | 3/1998 |
| WO | 2007/061956 A2 | 5/2007 |
| WO | 2007/067342 A2 | 6/2007 |

\* cited by examiner

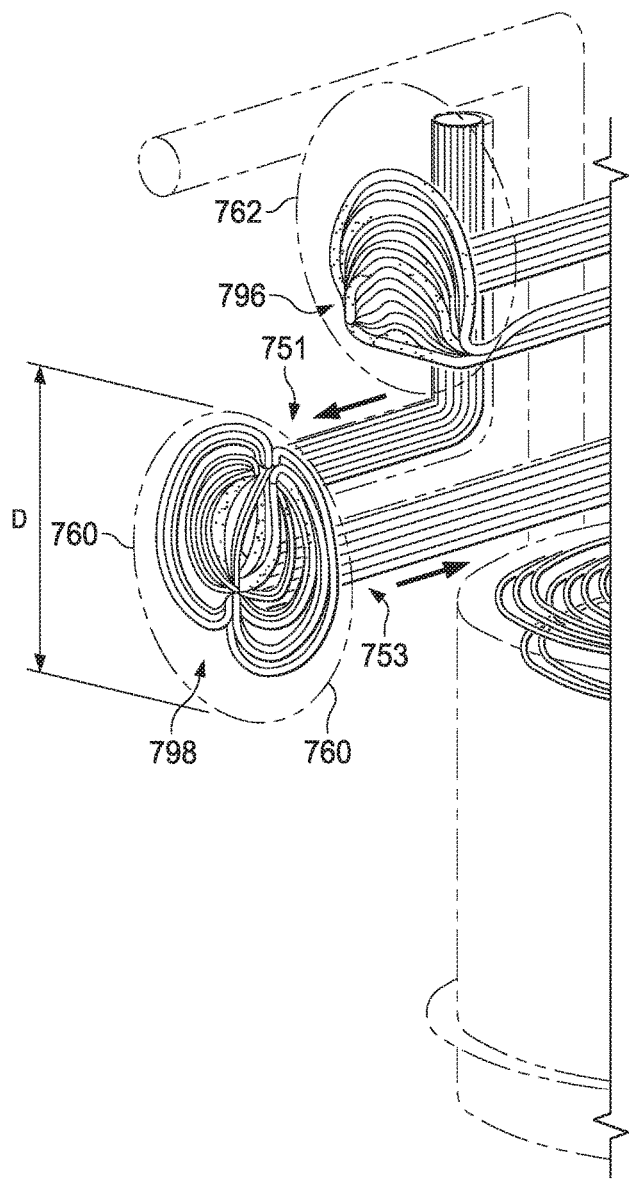
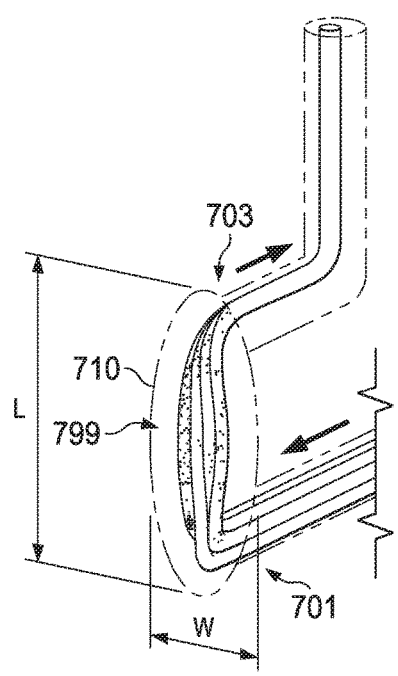
FIG. 7B
FIG. 7A

OBLONG DIAPHRAGM VALVES

RELATED APPLICATIONS

This application claims a benefit of International Application No. PCT/US2016/038805, filed on Jun. 22, 2016, which in turns claims priority to U.S. Provisional Application No. 62/183,249, filed Jun. 23, 2015, entitled "OBLONG DIAPHRAGM VALVES," the entireties of which are incorporated herein by reference for all purposes.

TECHNICAL FIELD

This disclosure relates to diaphragm valves. More particularly, embodiments described herein relate to oblong diaphragm valves, useful for high precision pumps as well as low volume displacement, high/low flow pressure applications.

BACKGROUND

There are many applications for which precise control over the amount or rate at which a fluid is dispensed by a pumping apparatus is necessary. In semiconductor manufacturing processes, for example, it is important to control the amount and rate at which photochemicals, such as photoresist chemicals, are applied to a semiconductor wafer.

Many photochemicals used in the semiconductor industry are very expensive, costing a thousand or more per a liter. Additionally, these chemicals may be susceptible to breaking down or gelling within a short time. Therefore, it is advantageous to utilize pumping systems which minimize unused volume and prevent stagnation of fluid contained therein.

Pumping systems, such as those used in semiconductor manufacturing, may utilize a number of diaphragm valves to move or exert pressure on the process fluid. Hydraulic fluid is typically used to assert pressure on one side of the diaphragm to cause the diaphragm to move, thereby displacing the process fluid. The hydraulic fluid could be put under pressure by a pneumatic piston or a stepper motor driven piston.

Existing diaphragm valves are usually round or circular in shape. To get the displacement volume required by dispense pumps, a typical diaphragm valve has to have a diaphragm with a relatively large surface area that is much larger than the area between the inlet and outlet. Consequently, the valve chamber often has a larger than necessary volume and a cross-sectional profile of a circle with a relatively large diameter. This can result in a holdup volume of processing fluid being left in the valve chamber after a dispense operation which, in turn, may cause stagnation of fluid and/or gelling issues. Furthermore, the relatively large diameter of the valve chamber can make controlling pressure drop across the diaphragm valve very difficult which, in turn, may negatively affect precision in pumping operations. In view of at least these issues, there is room for innovations and improvements.

SUMMARY

A diaphragm (or membrane) valve generally has a valve body with two or more ports, a diaphragm (which is also referred to as a membrane or a thin flexible sheet of material, collectively referred to hereinafter as a diaphragm), and a seat or "saddle" against which the diaphragm closes the valve. The valve body can be constructed in many materials such as plastic or metal.

Existing diaphragm valves are circular in nature—the diaphragm has a circular shape and the seat is defined by a hemispherical structure having a three-dimensional curved surface that resembles the inner surface of a sphere or bowl. Embodiments disclosed herein provide a new and improved non-circular, oblong diaphragm valve useful for a variety of applications, including high precision pumping systems.

The oblong diaphragm valve has a cross-sectional profile that can be described as non-circular, elliptical, or elongated, with a length greater than its width and without any corners or angles (i.e., the cross-sectional profile has no diverging lines). In some embodiments, an oblong diaphragm valve may have a first part and a second part. The first part of the oblong diaphragm valve may have a first depression or curved surface carved into the first end face of a body such as a dispense block. The second part of the oblong diaphragm valve may have a second depression or curved surface carved into the second end face of a plate such as a valve plate. The first curved surface and the second curved surface having the same or substantially the same non-circular, oblong, elliptical, or elongated shape having a length and a width, with the length being greater than the width.

When the body and the plate are joined and secured to each other, with a diaphragm sandwiched there-between, the curved surfaces define an oval or egg-shaped valve chamber. An inlet and an outlet are defined in the curved surface of the body at opposite ends which are defined by a length of the valve chamber. A flow passage is defined in the curved surface of the plate and has an opening centrally located relative to the valve chamber for actuation of the diaphragm to close or open the oblong diaphragm valve. For example, the oblong diaphragm valve may be opened through application of a vacuum which may cause the diaphragm to be drawn away from the inlet and outlet, allowing fluid to flow into and out of the valve chamber. Application of a pressure may push the diaphragm against the valve inlet and outlet, preventing fluid flow through the oblong diaphragm valve and closing the oblong diaphragm valve.

In some embodiments, a system may include a body having a first end face, a plate having a second end face, and an oblong diaphragm valve disclosed herein. In some embodiments, the body can be a part of a dispense block in a pump and the plate can include a valve plate. In some embodiments, the oblong diaphragm valve may have a first part, a second part, a valve chamber, an inlet, an outlet, a diaphragm, and a flow passage. The second end face of the valve plate can be structured to couple to the first end face of the dispense block such that the diaphragm of the oblong diaphragm valve is sandwiched between the first part and the second part of the oblong diaphragm valve.

The first part of the oblong diaphragm valve may have a first curved surface carved into the first end face of the body and the second part of the oblong diaphragm valve may have a second curved surface carved into the second end face of the plate. The first curved surface and the second curved surface may have the same or substantially the same oblong shape, which can have a length and a width, with the length greater than the width.

The valve chamber may have a volume defined by the first curved surface and the second curved surface in the first part and the second part of the oblong diaphragm valve. Furthermore, the valve chamber may have a first end and a second end defined by the length of the oblong shape. In some embodiments, the valve chamber may have an oval, egg-shaped three-dimension space. In some embodiments, the valve chamber may have a cross-sectional profile of a non-circular shape, with no corners or diverging lines.

The inlet may be defined in the first part of the oblong diaphragm valve and proximal to the first end of the valve chamber for directing a fluid into the valve chamber. The outlet may be defined in the first half of the oblong diaphragm valve and proximal to the second end of the valve chamber for directing the fluid out of the valve chamber.

The diaphragm may be sandwiched between the first part and the second part of the oblong diaphragm valve. In this disclosure, double concavity refers to the first curved surface and the second curved surface on both sides of the diaphragm. In some embodiments, the first curved surface defined in the first end face of the body and the second curved surface defined in the second end face of the plate have the same depth or substantially the same depths.

In some embodiments, the depth may depend on one or more factors. Examples of factors may include, but are not limited to, an amount of vacuum or pressure required to fully displace the diaphragm in the valve chamber, an extent of expected stress on the diaphragm during operation of the oblong diaphragm valve, a temperature or range of temperatures having an effect on the diaphragm, a dispense volume, an expected failure rate for the diaphragm, an expected lifespan of the diaphragm, a diameter of the inlet, a diameter of the outlet, a viscosity of the fluid, or a combination thereof.

The flow passage may be defined in the second part of the oblong diaphragm valve and may have an opening centrally located relative to the valve chamber. A vacuum or pressure may be applied to the diaphragm via the centrally located flow passage to open or close the oblong diaphragm valve. In some embodiments, the first curved surface may define a seat against which the diaphragm adapts to match with minimal or no stress when pressure is applied via the flow passage and the opening defined in the second part of the oblong diaphragm valve to close the oblong diaphragm valve. In some embodiments, the second curved surface may define a seat against which the diaphragm adapts to match with minimal or no stress when vacuum is applied via the flow passage and the opening defined in the second part of the oblong diaphragm valve to open the oblong diaphragm valve and allow the fluid to flow from the inlet to the outlet.

In some embodiments, a system may further include a distorted, oblong shaped O-ring, a first sealing channel or groove, and a second sealing channel or groove. The distorted, oblong shaped O-ring may be defined in the first part of the oblong diaphragm valve. The first sealing channel or groove may have an oblong, elongated, elliptical, or non-circular shape surrounding the first curved surface in the first part of the oblong diaphragm valve. The second sealing channel or groove may be defined in the second part of the oblong diaphragm valve. The second sealing channel or groove may have an oblong, elongated, elliptical, or non-circular shape surrounding the second curved surface in the second part of the oblong diaphragm valve.

In some embodiments, the first sealing channel or groove may be dimensioned to receive or otherwise accommodate the distorted, oblong shaped O-ring therein. When the first part and the second part of the oblong diaphragm valve are joined and secured to each other, the distorted, oblong shaped O-ring presses the diaphragm into the second sealing channel or groove defined in the second part of the oblong diaphragm valve such that a seal is created and the diaphragm is fixed in place.

In some embodiments, the second sealing channel or groove may be dimensioned to receive or otherwise accommodate the distorted, oblong shaped O-ring therein. When the first part and the second part of the oblong diaphragm valve are joined and secured to each other, the distorted, oblong shaped O-ring presses the diaphragm into the first sealing channel or groove defined in the first part of the oblong diaphragm valve such that a seal is created and the diaphragm is fixed in place.

Embodiments of an oblong diaphragm valve disclosed herein can provide many advantages. For example, the overall size of the oblong diaphragm valve (and thus fluid volume held in the valve) can be significantly smaller than conventional circular diaphragm valves due to the oblong, non-circular, elliptical, or elongated cross-sectional shape of the oblong diaphragm valve. This reduction, in turn, can result in less wasted fluid. The smaller form factor of the oblong diaphragm valve may also afford greater flexibility in configuring a dispense block, for instance, in arranging internal passages or other features of the dispense block. Smaller oblong diaphragm valves can also reduce the overall size of the pump and/or allow more valves to fit in a given space. Furthermore, valve inlets and outlets may be more advantageously oriented, such as a vertical orientation which may reduce bubbles or other undesirable effects.

Additionally, the oblong diaphragm valve has many novel features that allow the diaphragm to close or open the oblong diaphragm valve with minimal or no stress. These features include, for instance, creating double concavity on both sides of the diaphragm, maximizing distance between the valve inlet and outlet on one side of the diaphragm, centrally locating flow passage on the other side of the diaphragm, etc. The reduction, or elimination, of stress on the diaphragm, in turn, can ensure durability and longevity of the oblong diaphragm valve, reduce pressure spikes on actuating the diaphragm, and increase precision in pumping operations. The oblong diaphragm valve can also reduce stagnation of fluid which, in turn, reduces or prevents degradation of the fluid and/or gelling, which can be harmful to the finished product or even cause blockage in the pump.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 7A depicts a diagrammatic representation illustrating example flow patterns produced by circular diaphragm valves in a pumping system.

FIG. 7B depicts a diagrammatic representation of an example flow pattern produced by an oblong diaphragm valve in a pumping system according to some embodiments.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

A diaphragm valve has a valve chamber, a diaphragm (or membrane) disposed in the valve chamber, and a valve body with two or more ports, at least one of which is connected to an actuator for actuating the diaphragm to open or close the diaphragm valve. A diaphragm can also be referred to as a membrane or a thin flexible sheet of material. For the sake of clarity and not of limitation, these terms are collectively referred to in this disclosure as a diaphragm.

Existing diaphragm valves are typically circularly shaped, defined by a hemispherical (i.e., one half of a sphere) structure having a three-dimensional curved surface that resembles the inner surface of a sphere or bowl and that has a cross-sectional profile that resembles a circle. Such diaphragm valves are referred to herein as circular diaphragm valves. Examples of circular diaphragm valves can be found in International Application No. PCT/US2006/044906, filed Nov. 20, 2006, published as WO 2007/061956 A2, which is hereby fully incorporated by reference herein. Embodiments disclosed herein provide a new and improved non-circular, oblong diaphragm valve useful for a variety of applications, including high precision pumping systems. For example, oblong diaphragm valves can be implemented as an input valve, an isolation valve, a barrier valve, a purge valve, and a vent valve, and integrated into a dispense block in a pumping system used in semiconductor manufacturing.

Figure 1:
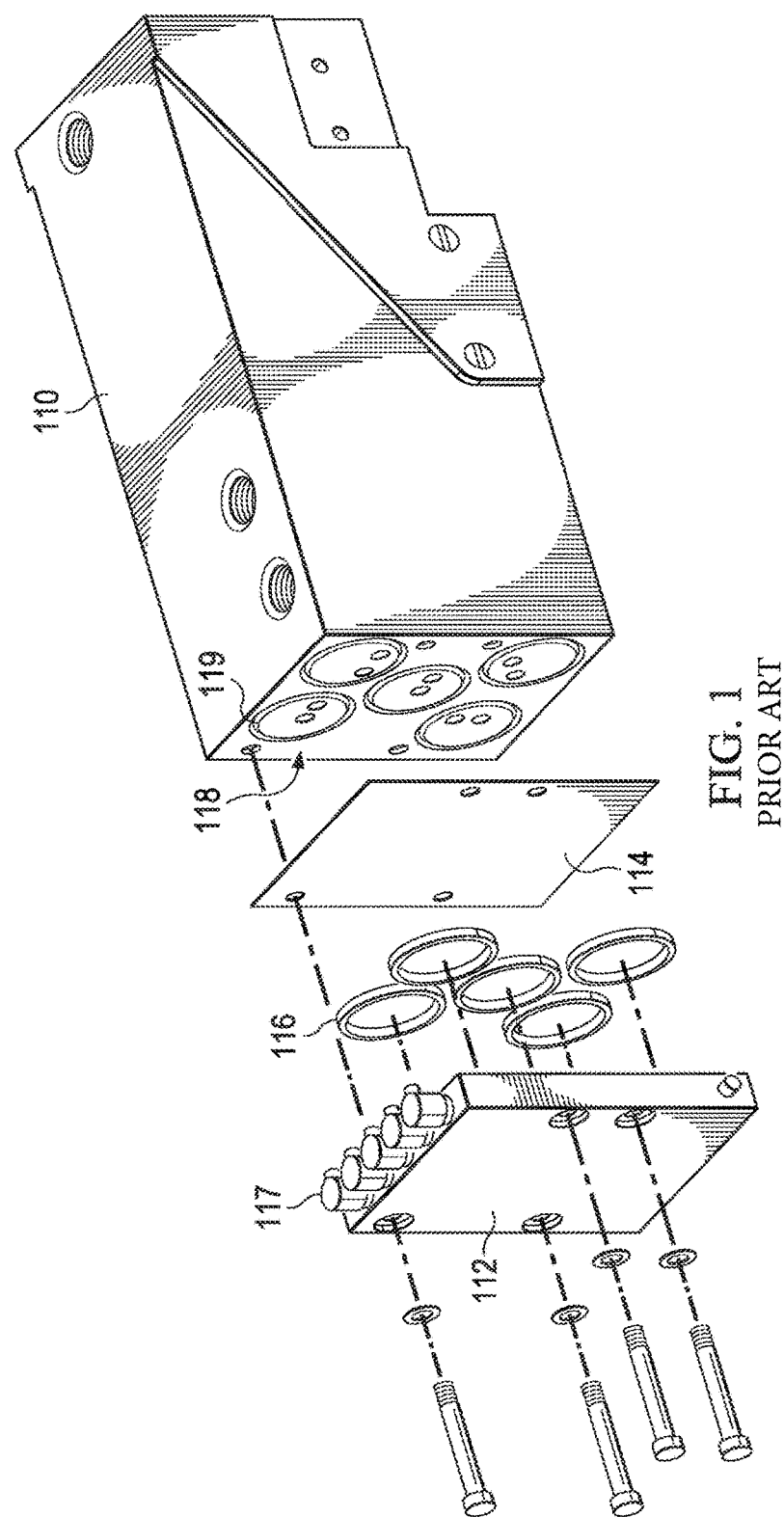
FIG. 1 depicts a diagrammatic representation illustrating a dispense block, a valve plate, and circular diaphragm valves.

As illustrated in FIG. 1, circular diaphragm valve 118 can be formed of multiple pieces and disposed between dispense block 110 (or other part of a pump body or a valve body) and valve plate 112. Annular ring 119 is defined on an end surface of dispense block 110 around circular diaphragm valve 118 for sealing with O-ring 116. This is further described below.

Dispense block 110 can be made of a synthetic fluoropolymer of tetrafluoroethylene such as polytetrafluoroethylene (PTFE) or modified PTFE. A sheet of elastomeric or flexible material 114 is sandwiched between an end surface of valve plate 112 and an end surface of dispense block 110. As FIG. 1 exemplifies, a single sheet of material 114 can be used to form multiple diaphragms for multiple circular diaphragm valves, although multiple sheets may also be used. Valve plate 112 can be machined out of aluminum, while material 114 can include PTFE or modified PTFE. Other suitable materials can also be used.

Figure 2:
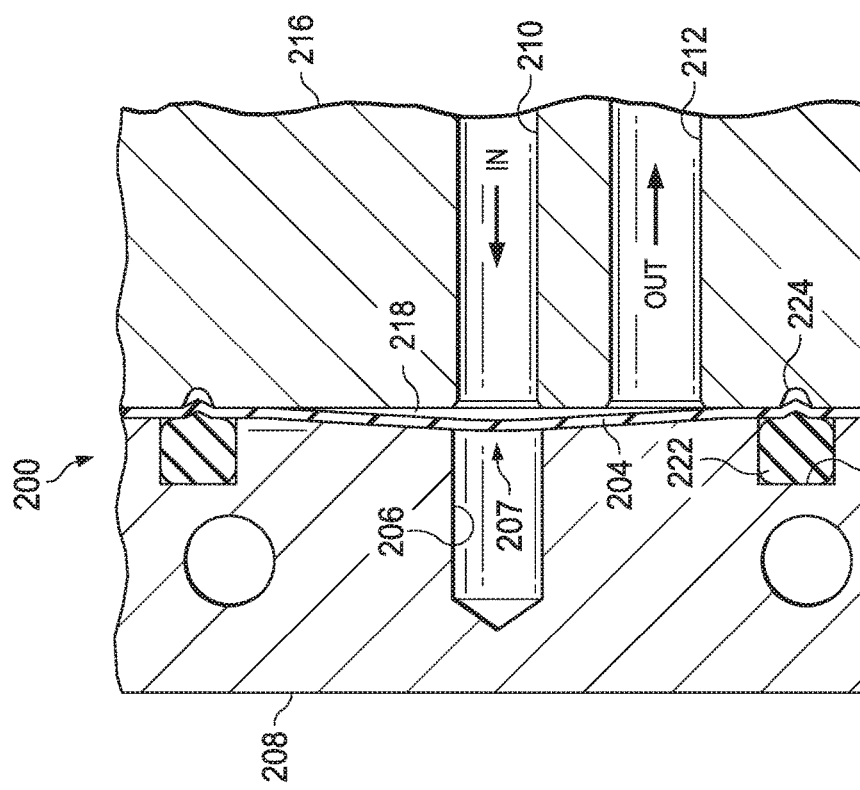
FIG. 2 depicts a diagrammatic representation of a cross-sectional view of an example diaphragm valve having a hemispherical valve chamber defined by single concavity in a valve plate.

FIG. 2 depicts a diagrammatic representation of a cross-sectional view of circular diaphragm valve 200 (which can be an embodiment of circular diaphragm valve 118 shown in FIG. 1). Circular diaphragm valve 200 has a hemispherical valve chamber 218 defined by single concavity carved into an end surface of valve plate 208. In this example, circular diaphragm valve 200 is shown in an open position, in which diaphragm 204 in valve chamber 218 is displaced, allowing a fluid to flow from inlet 210 into valve chamber 218 and out of outlet 212. In this example, both inlet 210 and outlet 212 are defined on a flat end surface of dispense block 216. Annular ring 224 is also defined on the flat end surface of dispense block 216. Annular ring 224 is dimensioned or otherwise sized to accommodate valve chamber 218 and provides for sealing with O-ring 222, as explained below.

The concavity defined in valve plate 208 which defines valve chamber 218 may represent an arced valve seat from the center of valve chamber 218 to the edge of valve chamber 218, towards which diaphragm 204 displaces radially, in a semi-hemispherical shape. Since the end surface of dispense block 216 which forms part of the valve body for circular diaphragm valve 200, valve chamber 218 has a hemispherical shape that resembles the inner surface of a bowl or sphere. When circular diaphragm valve 200 opens, diaphragm 204 displaces against and adapts to match the hemispherical shape of valve chamber 218. This eliminates dead volume(s) when circular diaphragm valve 200 is open. The circular edge of valve chamber 218 and the constant radius of the arced surface allow stress to be distributed radially and evenly across diaphragm 204.

Circular diaphragm valve 200 can be actuated via flow passage 206 defined in valve plate 112, as illustrated in FIG. 2. Flow passage 206 can run from a valve control inlet (e.g., valve control inlet 117 shown in FIG. 1) on a side of valve plate 208 to opening 207 in the arced surface of valve chamber 218. By application of a valve control gas/vacuum or other pressure via flow passage 206, actuation of circular diaphragm valve 200 can be achieved to cause displacement of diaphragm 204. More specifically, by selective application of vacuum or reduced pressure through flow passage 206 defined in valve plate 208, diaphragm 204 can be displaced into the hemispherical structure of valve chamber 218, thereby causing circular diaphragm valve 200 (which can, for example, be a purge valve) to open. Pressure applied through flow passage 206 defined in valve plate 208 can cause diaphragm 204 to be displaced away from the hemispherical structure of valve chamber 218 and towards inlet 210 and outlet 212 defined in dispense block 216, thereby causing circular diaphragm valve 200 to close. The displacement volume (in milliliter or mL) of circular diaphragm valve 200 can be fixed. Multiple circular diaphragm valves in the same pumping system may have the same or different fixed displacement volumes.

Additionally, different amounts of vacuum/pressure may be applied to circular diaphragm valves in the same pumping system. In some cases, a minimum amount of vacuum or pressure may be applied to a diaphragm to open or close a circular diaphragm valve. For example, pressure (e.g., 35 pounds per square inch (psi)) can be applied to diaphragm 204 via flow passage 206 defined in valve plate 208 to close circular diaphragm valve 200 and vacuum (e.g., 10 Hg (inches of mercury)) can be applied to diaphragm 204 via flow passage 206 defined in valve plate 208 to open circular diaphragm valve 200.

In the example of FIG. 2, valve plate 208 is connected and secured to dispense block 216, with diaphragm 204 sandwiched between them. Annular ring 220 is defined on an end surface of valve plate 208 and dimensioned to surround or otherwise accommodate valve chamber 218 and seating O-ring 222. When valve plate 208 is attached to dispense block 216, O-ring 222 presses diaphragm 204 into annular ring 224 defined on an end surface of dispense block 216, further sealing circular diaphragm valve 200. This creates a seal and fixes diaphragm 204 in place.

As described above, valve chamber 218 can be sized to allow diaphragm 204 to displace sufficiently to allow a fluid to flow from inlet 210, into valve chamber 218, and out of valve chamber 218 through outlet 212. Additionally, valve chamber 218 can be sized to minimize pressure drop while reducing the displacement volume. For example, if the valve chamber is made too shallow, diaphragm 204 may unduly constrict fluid flow for a particular application even when circular diaphragm valve 200 is fully opened. However, as the depth of valve chamber 218 increases, the minimum amount of vacuum needed to fully displace diaphragm 204 to open circular diaphragm valve 200 (i.e., at a position in which diaphragm 204 is fully displaced into valve chamber 218) also increases, leading to additional stress on diaphragm 204. While valve chamber 218 can be sized to balance the flow characteristics of circular diaphragm valve 200 with the stress on diaphragm 204, this balancing act is constrained by the circular nature of diaphragm valve 200.

Circular diaphragm valve 200 can be implemented in many ways. For example, flow passage 206 does not have to be centered in valve chamber 218 and may be off center. Additionally, inlet 210 and outlet 212 can be positioned in any position that allows a fluid to flow between them when circular diaphragm valve 200 is at an open position and be restricted when circular diaphragm valve 200 is at a closed position. In the example of FIG. 2, inlet 210 defined in dispense block 216 is centrally located on the opposite side of opening 207, which is also centrally located and defined in valve plate 208. Outlet 212 is positioned off-center and is relatively close to inlet 210. Because outlet 212 is further from the center of valve chamber 218 (and hence is further from the center of the hemisphere structure or depression defined in valve plate 208) than inlet 210, a smaller amount of fluid is displaced through outlet 212 than inlet 210 when circular diaphragm valve 200 is closed.

The positioning of these ports and flow passages can be reversed or otherwise varied from implementation to implementation. For example, it may be desirable in some applications to displace less fluid back to a dispense chamber and more to a feed chamber when a purge valve closes. For an inlet valve, it may be desirable in some applications to have an inlet flow passage to be closer to the center of a feed chamber so that more fluid is displaced back to the fluid source than to the feed chamber when the inlet valve is closed. In some cases, it may be desirable to arrange inlets and outlets of various valves in disparate positions to reduce the amount of fluid pushed into a dispense chamber when the valves close. Other configurations of inlet and outlet flow passages can also be utilized. For example, both the inlet and outlet flow passage to a valve can be off center. As another example, the widths of the inlet and outlet flow passages can be different so that one flow passage is more restricted, again helping to cause more fluid to be displaced through one of the flow passages (e.g., the larger flow passage) when the valve closes.

Circular diaphragm valves with hemispherical valve chambers such as valve chamber 218 described above can have an approximately constant displacement regardless of the amount of vacuum applied. For example, a circular diaphragm valve having a hemispherical valve chamber with a 0.022 inch radius may displace 0.047 mL of fluid; a circular diaphragm valve having a hemispherical valve chamber with a 0.015 inch radius may displace 0.040 mL of fluid; and a circular diaphragm valve having a hemispherical valve chamber with a 0.010 inch radius may displace 0.030 mL of fluid, even if the same amount of vacuum (e.g., 10 Hg) is applied to their differently sized diagrams. This allows for placements of multiple circular diaphragm valves with different, repeatable displacement volumes on the same valve plate.

The size of each such circular diaphragm valve can be selected to balance the desire to minimize the pressure drop across the valve (i.e., the desire to minimize the restriction caused by the circular diaphragm valve in the open position) and the desire to minimize the amount of holdup volume of the circular diaphragm valve. That is, the multiple circular diaphragm valves can be dimensioned to balance the desire for minimally restricted flow and to minimize pressure spikes when they open/close. Following the above example, a smaller purge valve can minimize the amount of holdup volume that returns to a dispense chamber when the purge valve closes. Additionally, the multiple circular diaphragm valves can be dimensioned to be fully opened when a threshold vacuum is applied. For example, a purge valve can be dimensioned to be fully opened when 10 Hg of vacuum is applied. As the vacuum increases, the purge valve will not open any further.

These multiple circular diagram valves may have different dimensions for different functions. For example, a purge valve can be smaller than the other valves or the valves can be otherwise dimensioned. As a specific example, a valve chamber having a hemispherical surface with a spherical depth d of 0.015 inches may correspond to a sphere with a radius r of 3.630 inches. As another specific example, a valve chamber having a spherical depth d of 0.022 inches may correspond to a sphere with a radius r of 2.453 inches. As yet another example, a circular diagram valve having an inner diameter of 0.797 inches with a surface area (at resting) of 0.4989 sq. in. may define a valve volume ($V_{valve}$) of 0.12 CC (e.g., given that $V_{valve}=\frac{1}{6}\pi d(3r^2+d^2)$). Skilled artisans appreciate the mathematical relationship between depth d and radius r in the given examples.

Figure 3:
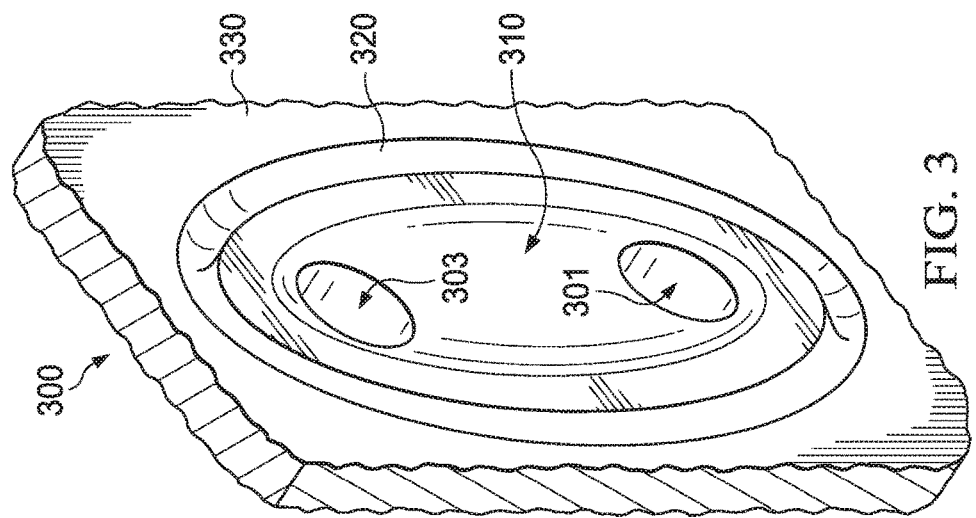
FIG. 3 depicts a diagrammatic representation of a perspective view of an example oblong diaphragm valve according to some embodiments.

FIG. 3 depicts a diagrammatic representation of a perspective view of example oblong diaphragm valve 300 according to some embodiments. Oblong diaphragm valve 300 can be made using materials similar to those described above with reference to circular diaphragm valve 118 of FIG. 1 and circular diaphragm valve 200 of FIG. 2, and can operate in a high precision pump such as the pump with reduced form factor disclosed in the above-referenced WO 2007/061956 A2. Skilled artisans appreciate that embodiments of an oblong diaphragm valve disclosed herein are not limited to pump applications and can be used where low volume displacement and/or high/low flow pressure diaphragm valves are needed. Other implementations are also possible.

Within this disclosure, the term "oblong" refers to an elongated shape. Oblong diaphragm valves may have a non-circular shape and may occupy less surface area than existing valves such as circular diaphragm valves described above. Embodiments of oblong diaphragm valves may have an oval, an elliptical, a rectangular, a stadium, or otherwise non-circular shape. Those skilled in the art recognize that many non-circular shapes may be implemented in view of this disclosure.

The non-circular shape of an oblong diaphragm valve represents a deviation from a circular or spherical shape of a circular diaphragm valve. The deviation may manifest, for instance, in an elongation extending from a circle in one direction and forming an oblong with approximately parallel sides. This deviation can cause foundational and fundamental change in how a valve is formed and operates. For example, the dimensional measurements of hemispherical valve chambers described above can change when their shape is deviated and no longer hemispherical. As described below, oblong diaphragm valves can significantly improve valve operation (such as that of a pump) in many areas.

In some embodiments, an oblong diaphragm valve may have a valve body, a valve chamber, an inlet, an outlet, a diaphragm, and a flow passage. The valve body may have a first half and a second half. The diaphragm may be sandwiched between the first half and the second half of the valve body. The first half of the valve body may have a first depression defined in a face or end surface of a body, block, or substrate. The second half of the valve body may have a second depression defined in a face or end surface of a valve plate.

In some embodiments, the first depression and the second depression may have the same or substantially the same oblong shape. The oblong shape may have a length and a width, with the length greater than the width.

In some embodiments, the first depression and the second depression may have the same or substantially the same depth. In some embodiments, the depth may vary from implementation to implementation depending upon one or more factors. Examples of factors may include, but are not limited to, an amount of vacuum or pressure required to fully displace the diaphragm in the valve chamber, an extent of expected stress on the diaphragm during operation of the oblong diaphragm valve, a temperature or range of temperatures having an effect on the diaphragm, a dispense volume, an expected failure rate for the diaphragm, an expected lifespan of the diaphragm, a diameter of the inlet, a diameter of the outlet, a viscosity of the fluid, or a combination thereof.

The flow passage may be defined in the second half of the valve body and may have an opening centrally located relative to the valve chamber for actuation of the diaphragm to close or open the oblong diaphragm valve. The inlet may be defined in the first half of the valve body and proximal to the first end of the valve chamber for directing a fluid into the valve chamber when the oblong diaphragm valve is at an open position. The outlet may be defined in the first half of the valve body and proximal to the second end of the valve chamber for directing the fluid out of the valve chamber when the oblong diaphragm valve is at the open position.

When pressure is applied via the flow passage and the centrally located opening defined in the second half of the valve body to close the oblong diaphragm valve, the diaphragm displaces towards the first depression with minimal or no stress and adapts to match the concaved surface of the first depression. When vacuum is applied via the flow passage and the centrally located opening defined in the second half of the valve body to open the oblong diaphragm valve and allow the fluid to flow from the inlet to the outlet, the diaphragm displaces towards the second depression with minimal or no stress and adapts to match the concaved surface of the second depression. The concaved surfaces of the first and second depressions (double concavity) together form an oval, egg-shaped valve chamber.

The oval, egg-shaped valve chamber may have a cross-sectional profile of a non-circular shape with no corners or diverging lines. The cross-sectional profile of the valve chamber may have a first end and a second end defined by the length of the non-circular shape. The valve chamber may have a volume defined by the first depression and the second depression (e.g., depths, lengths, and/or widths) in the first half and the second half of the valve body.

To seal the oblong diaphragm valve, a distorted, oblong shaped O-ring may be used. The oblong diaphragm valve may have a first sealing channel or groove defined in the first half of the valve body and a second sealing channel or groove defined in the second half of the valve body. The first sealing channel or groove defined in the first half of the valve body may have an oblong, elongated, elliptical, or non-circular shape dimensioned to surround or otherwise accommodate the first depression in the first half of the valve body. The second sealing channel or groove defined in the second half of the valve body may have an oblong, elongated, elliptical, or non-circular shape dimensioned to surround or otherwise accommodate the second depression in the second half of the valve body.

In some embodiments, the first sealing channel or groove may be dimensioned to receive the distorted, oblong shaped O-ring therein. When the first half and the second half of the valve body are joined and secured to each other, the distorted, oblong shaped O-ring presses the diaphragm into the second sealing channel or groove defined in the second half of the valve body such that a seal is created and the diaphragm is fixed in place. Alternatively, the second sealing channel or groove may be dimensioned to receive the distorted, oblong shaped O-ring therein. When the first half and the second half of the valve body are joined and secured to each other, the distorted, oblong shaped O-ring presses the diaphragm into the first sealing channel or groove defined in the first half of the valve body such that a seal is created and the diaphragm is fixed in place.

Referring to FIG. 3, oblong diaphragm valve 300 may have valve chamber 310 at least partially defined by a curved surface carved into a face or end surface of body, substrate, or block 330. Additionally, oblong diaphragm valve 300 may have inlet 301 and outlet 303 defined in block 330 for directing a flow into and out of valve chamber 310. Preferably, inlet 301 is positioned below and aligned with outlet 303 along a generally vertical axis relative to block 330. Alternatively, inlet 301 can be positioned below and aligned with outlet 303 along any angle relative to a vertical axis as dictated by inlet 301 and outlet 303 positions. Sealing channel or groove 320 may be recessed into the face or end surface of block 330. Sealing channel or groove 320 may be dimensioned to surround or otherwise accommodate valve chamber 310.

As illustrated in FIG. 3, inlet 301 and outlet 303 are positioned on opposite ends along the length of oblong diaphragm valve 300. Since, as illustrated in FIG. 4A, there are no opposite ends in a circle or sphere, a straight line passing from side to side through the center of the circle or sphere is known as the diameter (D) and not "length" (L).

Figure 4B:
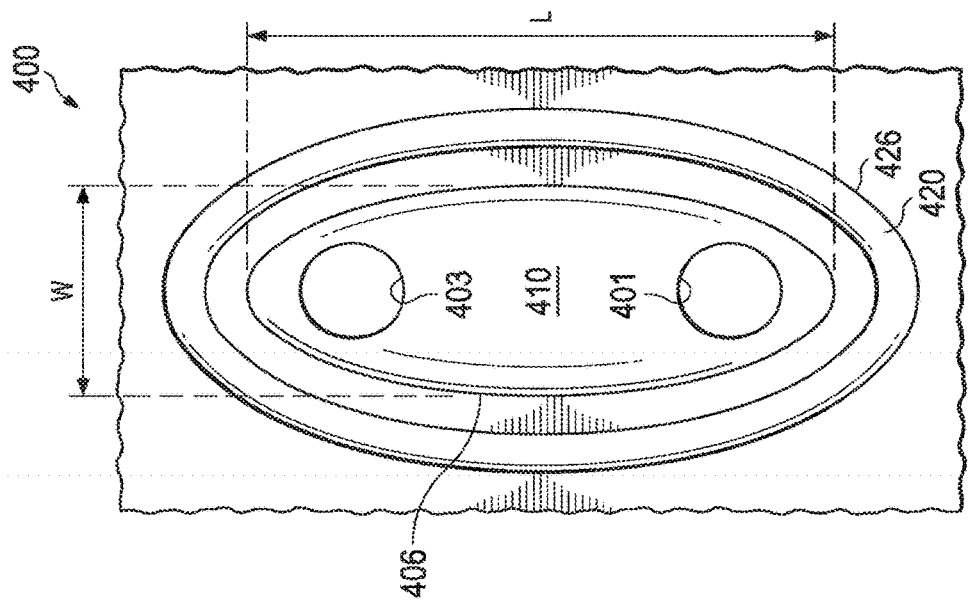
FIG. 4B depicts a diagrammatic representation of a cutaway view of an example oblong diaphragm valve according to some embodiments.
Figure 4A:
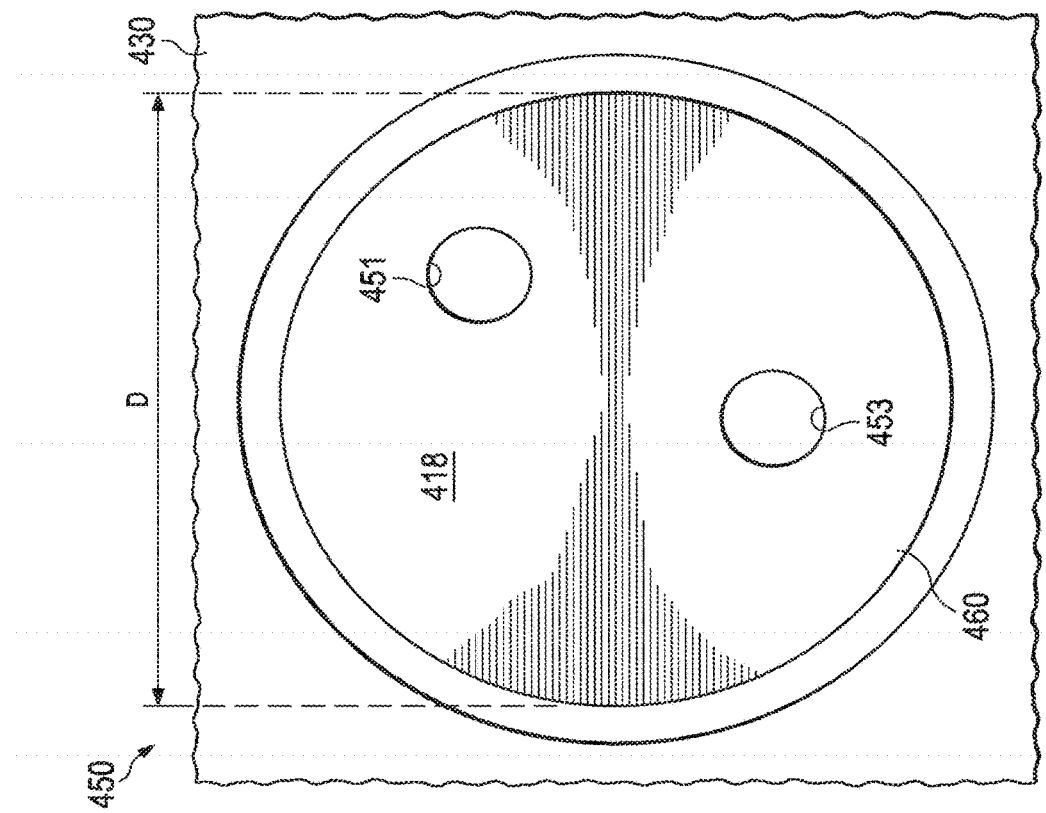
FIG. 4A depicts a diagrammatic representation of a cutaway view of an example circular diaphragm valve.

In the example of FIG. 4A, circular diagram valve 450 has valve chamber 418, inlet 451, and outlet 453 defined on a flat face or end surface of block 430. Valve chamber 418 has cross-sectional profile 460 that is circular and that has a diameter D (e.g., 0.797 inches). The volume of valve chamber 418 is defined by the hemispherical structure having depth d and radius r (half of D, defined by a straight line from the center to the circumference of a circle or sphere represented by cross-sectional profile 460), as explained above.

As illustrated in FIG. 4B, the volume of a valve chamber and, consequentially, the overall size of a valve can be reduced without altering the positions of the inlet and outlet ports, which may be pre-defined on a body, substrate, or block as described above. For example, suppose the distance (center-to-enter) between inlet 401 and outlet 403 positioned in valve chamber 410 of oblong diaphragm valve 400 is the same or substantially the same as the distance between inlet 451 and outlet 453 positioned in valve chamber 418 of circular diaphragm valve 450, the overall size of oblong diaphragm valve 400 is smaller than that of circular diaphragm valve 450. This size reduction is possible because valve chamber 410 has cross-sectional profile 406.

In some embodiments, cross-sectional profile 406 can be described as having an oblong, oval, elongated, rectangular, stadium, elliptical, or otherwise non-circular shape defined by length L and width W, with W less than L. In some embodiments, the length L to width W ratio may be 2:1, 3:1, or there-between. Other L/W ratios may also be possible. As a non-limiting example, valve chamber 410 may have a length of 0.662 inches and a width of 0.258 inches. Sealing channel or groove 420 having cross-sectional profile 426 similar to cross-sectional profile 406 may be dimensioned to surround or otherwise accommodate valve chamber 410.

Compared with a circular diaphragm valve, an oblong diaphragm valve can take up less or significantly less space in a valve design (e.g., about half of what would be required for a circular diaphragm valve with a valve chamber diameter that is about the same as or similar to the valve chamber length of an oblong diaphragm valve) and thus can reduce the footprint requirement of the underlying device employing the oblong diaphragm valve. As a non-limiting example, valve chamber 418 of circular diaphragm valve 450 of FIG. 4A may occupy a total area of 0.4989 $in^2$ and a volume of 0.12 mL. By comparison, valve chamber 410 of oblong diaphragm valve 400 of FIG. 4B may occupy an area of 0.1342 $in^2$ and a volume of 0.032 mL, nearly one fourth the volume of circular diaphragm valve 450. This reduction can be magnified or made even more significant when multiple oblong diaphragm valves are used in place of multiple circular diaphragm valves. Furthermore, this reduction allows for greater design flexibility. For instance, more oblong diaphragm valves can be utilized in place of circular diaphragm valves without having to change the size of the underlying device. Additional benefits may include increased dispensing accuracy and reduced pressure spikes caused by actuating the valve. Because the valve chamber of an oblong diaphragm valve is smaller than that of a circular diaphragm valve, the holdup volume can also be reduced.

Figure 5B:
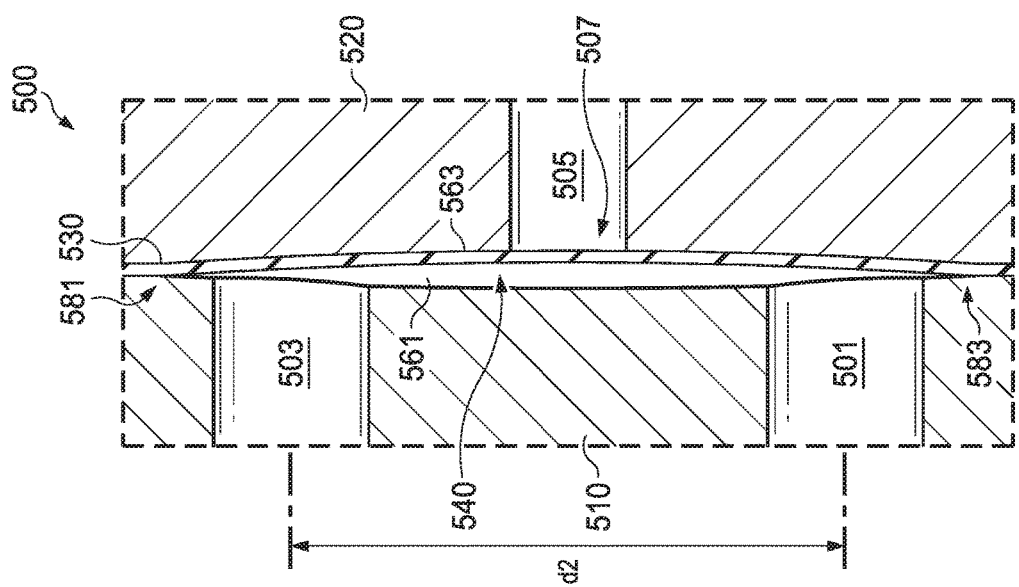
FIG. 5B depicts a diagrammatic representation of a cross-sectional view of an example oblong diaphragm valve according to some embodiments.
Figure 5A:
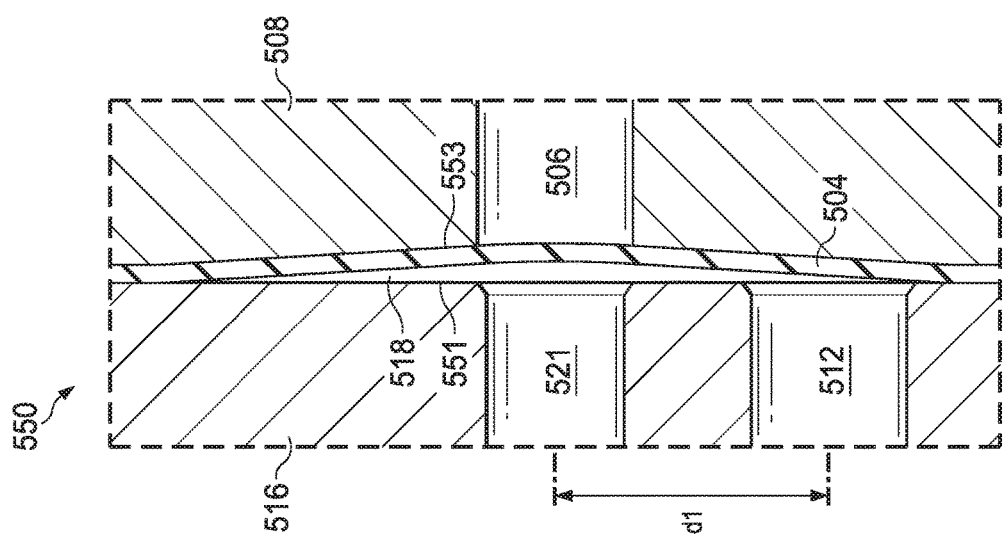
FIG. 5A depicts a diagrammatic representation of a cross-sectional view of an example circular diaphragm valve.

FIG. 5A depicts a diagrammatic representation of a cross-sectional view of example circular diaphragm valve 550. Circular diaphragm valve 550 can be the same or similar to circular diaphragm valve 200 described above. For example, circular diaphragm valve 550 may have a hemispherical valve chamber 518 defined by single concavity carved into end surface 553 of valve plate 508. In this example, circular diaphragm valve 550 is shown in an open position, in which diaphragm 504 in valve chamber 518 is displaced, allowing a fluid to flow from inlet 521 into valve chamber 518 and out of outlet 512. In this example, both inlet 521 and outlet 512 are defined on flat end surface 551 of dispense block 516. Similar to circular diaphragm valve 200 described above, annular rings (e.g., annular rings 220, 224) and an O-ring (e.g., O-ring 222) can be utilized to seal hemispherical valve chamber 518 and fix diaphragm 504 in place, as described above. For clarity, these features are not shown in FIG. 5A.

As illustrated in FIG. 5A, the single concavity defined in valve plate 508 has a hemispherical shape that resembles the inner surface of a bowl or sphere. When circular diaphragm valve 550 is actuated (e.g., via flow passage 506), diaphragm 504 displaces radially, towards concaved surface 553 of valve plate 508 to open circular diaphragm valve 550 or towards flat surface 551 of dispense block 516 to close circular diaphragm valve 550. In doing so, diaphragm 504 adapts a semi-hemispherical shape against concaved surface 553 when circular diaphragm valve 550 is at an open position and returns to a flattened shape against flat surface 551 when circular diaphragm valve 550 is at a close position.

Similar to circular diaphragm valve 200 described above, as the depth of valve chamber 518 increases, the minimum amount of vacuum needed to fully displace diaphragm 504 to open circular diaphragm valve 550 (i.e., at a position in which diaphragm 504 is fully displaced into valve chamber 518) also increases, leading to additional stress on diaphragm 504. To reduce the displacement volume and the stress that may be experienced by diaphragm 504, inlet 521 and outlet 512 are positioned close to each other, defined by distance d1 that is measured from the center of inlet 521 and to the center of outlet 512.

FIG. 5B depicts a diagrammatic representation of a cross-sectional view of example oblong diaphragm valve 500 according to some embodiments. Oblong diaphragm valve 500 can be the same or similar to oblong diaphragm valve 300 or oblong diaphragm valve 400 described above. In the example of FIG. 5B, body 510 and plate 520 may represent parts of a valve body of oblong diaphragm valve 500, with diaphragm 530 sandwiched between the parts. Body 510 can be made of PTFE or modified PTFE. Likewise, diaphragm 530 can be made of PTFE or modified PTFE. Plate 520 can be machined out of aluminum. Other suitable materials can also be used.

When joined and secured to each other, a first depression at concaved end surface 561 of body 510 and a second depression at concaved end surface 563 of plate 520 together form an oval, egg-shaped valve chamber 540. Similar to valve chamber 310 or valve chamber 410 described above, valve chamber 540 can have a cross-sectional profile having a non-circular, oblong, elliptical, or elongated shape, with a length greater than its width and without any corners or angles (i.e., the cross-sectional profile has no diverging lines).

Each of the first depression and second depression can be a smooth concaved surface machined or otherwise carved using finely spaced cuts of different depths and widths approximating a smooth concaved surface that is curved inward. As described above, valve chamber 540 of oblong diaphragm valve 500 is elongated so that it is longer than it is wide. The length and width of valve chamber 540 can be tightly dimensioned to accommodate inlet 501 and outlet 503, which are positioned at opposite ends 581, 583 along the length of valve chamber 540. Unlike inlet 521 and outlet 512 of circular diaphragm valve 550, inlet 501 and outlet 503 of oblong diaphragm valve 500 are positioned as far away from each other as possible. As such, the distance d2, which is measured from the center of inlet 501 and to the center of outlet 503, is greater or significantly greater than the distance d1 between inlet 521 and outlet 512 of circular diaphragm valve 550. Since the width of valve chamber 540 is significantly less than the length of valve chamber 540, a fluid flowing into valve chamber 540 from inlet 501 (e.g., via port 611 secured onto body 610 via fitting 621 shown in FIG. 6) is forced to flow directly to outlet 503 (e.g., and out via port 613 secured onto body 610 via fitting 623 shown in FIG. 6). This straightforward, directed flow pattern can reduce the time the fluid remains in valve chamber 540 and making the connection/disconnection between inlet 501 and outlet 503 more efficient.

When oblong diaphragm valve 500 closes (e.g., by application of pressure via flow passage 505 defined in plate 520), diaphragm 530 displaces towards concaved surface 561 of body 510 and adapts the non-circular shape of valve chamber 540. When oblong diaphragm valve 500 opens (e.g., by application of vacuum via flow passage 505 defined in plate 520), diaphragm 530 displaces towards concaved surface 563 of plate 520 and again adapts the non-circular shape of valve chamber 540. The double concavity of valve chamber 540 (which is defined by concaved surface 561 of body 510 and concaved surface 563 of plate 520) allows diaphragm 530 to be pushed against concaved surface 561 of body 510 with a reduced pressure (in psi) to close oblong diaphragm valve 500 or pulled against concaved surface 563 of plate 520 with less vacuum (in Hg) to open oblong diaphragm valve 500 than what would be required by single concavity valve chambers. Furthermore, the double concavity of valve chamber 540 can distribute and thus reduce the stress placed on diaphragm 530. Spacing inlet 501 and outlet 503 at opposite ends of valve chamber 540, away from centrally located opening 507 of flow passage 505 through which actuation is applied, can also help to distribute and thus reduce the stress placed on diaphragm 530.

The actual depths of concaved surfaces in an oblong diaphragm valve can vary from implementation to implementation. Generally, the shallower a concaved surface is, the smaller volume of fluid is held therein. This may have technical effects of reducing waste and pressure spikes as well as reducing stress on the diaphragm. However, the flow may be more restricted which, in turn, may require more power to pump the fluid. More pumping power may expedite degradation of the fluid or otherwise adversely affect the fluid due to the heat generated by increased power. As such, depths of concaved surfaces in an oblong diaphragm valve may be particularly selected to achieve a desired operation profile that balances many real-world considerations such as waste reduction, stagnation reduction, pressure spikes reduction, stress reduction, power consumption, heat generation, fluid degradation, fluid viscosity, longevity of diaphragm, etc.

In some embodiments, the concaved surfaces may have the same or approximately the same dimensions. This allows for the displacement volume of fluid (when oblong diaphragm valve 500 is open) to be the same or approximately the same as the holdup volume (when oblong diaphragm valve 500 is closed), regardless of the amount of vacuum applied (in the operational range of oblong diaphragm valve 500) and/or temperature. This displacement configuration allows a uniform volumetric correction to be implemented to correct for pressure spikes that may be caused by the displaced volume when oblong diaphragm valve 500 closes.

Because the concaved surfaces are defined in both body 510 and plate 520, each of the concaved surfaces can be even shallower than what would be required in single concavity valve chambers. This means that diaphragm 530 can be moved or stretched less in both directions when closing or opening oblong diaphragm valve 500 (towards/away from body 510, for instance). As the depth of concaved valve chamber 540 decreases, it takes less vacuum power to displace diaphragm 530 to its fully open position, reducing the stress on diaphragm 530. Furthermore, because diaphragm 530 is oblong shaped and thus is narrower in width, the stress on diaphragm 530 can be further reduced. Reducing the stress on the diaphragm may increase the lifespan of the diaphragm and may result in less frequent failures and reduced maintenance.

Valve chamber 540 can be sized to allow diaphragm 530 to displace sufficiently to allow fluid flow from inlet 501 to outlet 503, as described above. Additionally, valve chamber 540 can be sized to minimize pressure drop while reducing the displacement volume. Moreover, valve chamber 540 can be sized in view of a fluid property (e.g., viscosity) and/or to balance desired flow characteristics with the stress on diaphragm 530. For example, the length of valve chamber 540 may be based on or proportional to the diameter(s) of inlet 501 and/or outlet 503.

Other factors may be considered in determining a proper size of valve chamber 540. For example, it may be desirable that the stress on diaphragm 503 remains below the yield strength of its material when diaphragm 503 is fully displaced (either at an open position or at a closed position) in valve chamber 540.

As another example, it may be desirable to minimize the vacuum or pressure required to fully displace diaphragm 530 in valve chamber 540. In operation, the amount of vacuum available to open a valve may fluctuate. Also, the temperature of the diaphragm material may affect the amount of vacuum required to fully displace the diaphragm. Fully displacing the diaphragm may be important in certain applications such as semiconductor manufacturing where the dispense volume must be accurately controlled. If the available vacuum pressure is insufficient to fully displace the diaphragm, the dispense volume may be affected which may cause defects in the finished product. Therefore, in some embodiments, valve chamber 540 may be sized or otherwise dimensioned such that diaphragm 530 fully displaces in valve chamber 540, even in suboptimal conditions (e.g., low diaphragm temperature and/or low vacuum).

As yet another example, valve chamber 540 may be sized or otherwise dimensioned in consideration of an expected failure rate for diaphragm 530. Generally, holding everything else constant, the deeper the double concavity of valve chamber 540 is, the more stress will be on diaphragm 530, which may lead to a shorter life of diaphragm 530. Accordingly, the double concavity of valve chamber 540 may be particularly structured or otherwise configured in consideration of an expected failure rate relative to the expected lifespan of diaphragm 530. As a non-limiting example, valve chamber 540 may be sized or otherwise dimensioned such that diaphragm 530 has a less than 1% chance (an expected failure rate) to fail in 1- to 2-million cycles (an expected lifespan of diaphragm 530).

Figure 6:
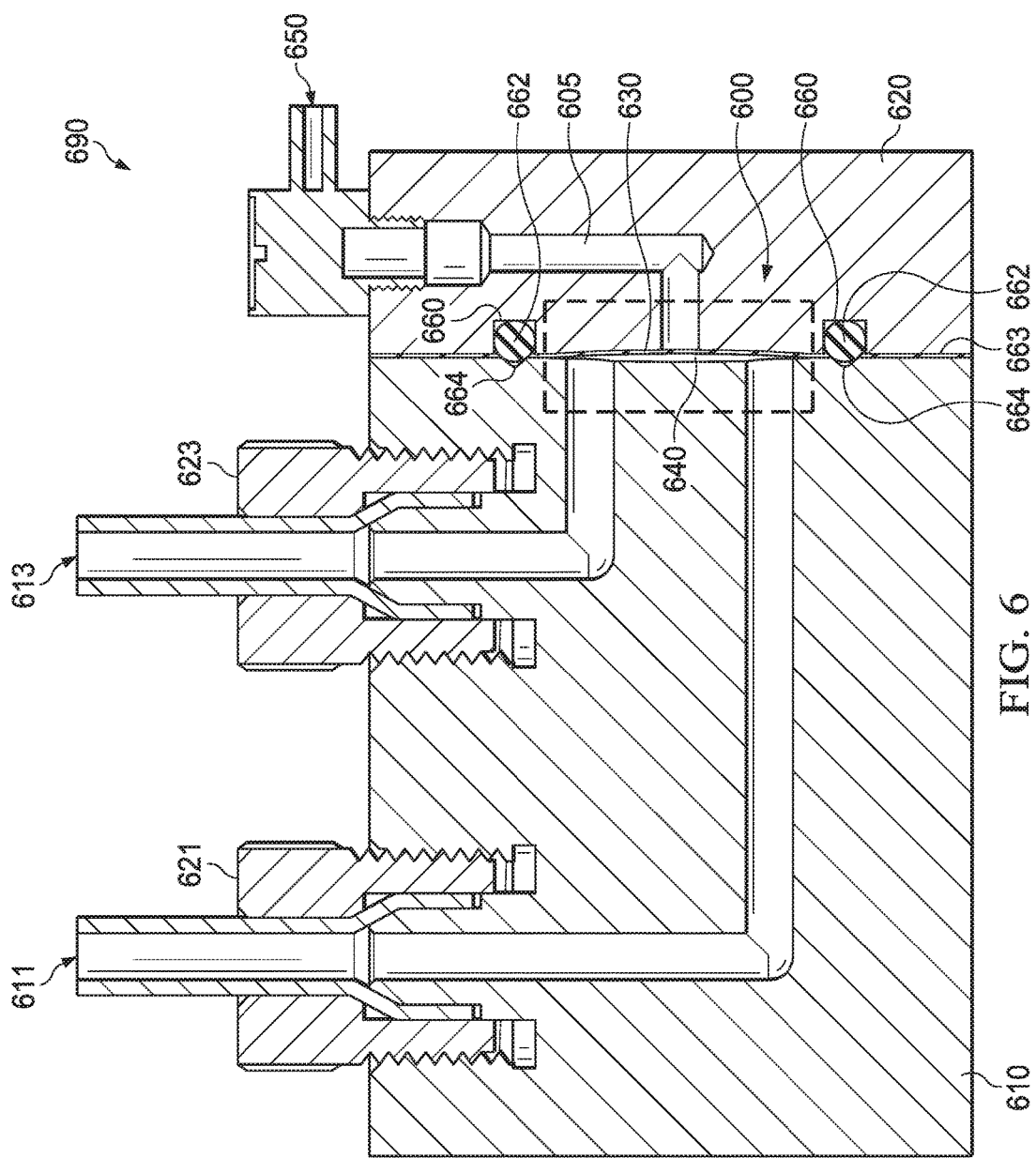
FIG. 6 depicts a diagrammatic representation of a cross-sectional view of a system having a body, a valve plate, and an oblong diaphragm valve according to some embodiments.

Embodiments of an oblong diaphragm valve described above can be implemented in many ways, utilized for different applications, and embodied on various types of devices. As a non-limiting example, FIG. 6 depicts a diagrammatic representation of a cross-sectional view of system 690 having body 610, valve plate 620, and oblong diaphragm valve 600. Oblong diaphragm valve 600 can be the same or similar to oblong diaphragm valve 500 described above with reference to FIG. 5. In some embodiments, system 690 may be part of a larger system such as a single-stage or multi-stage pump.

As described above, the body of oblong diaphragm valve 600 can be formed of multiple pieces and can include a double concavity valve chamber defined by concaved surfaces machined or otherwise carved into end surfaces of body 610 and valve plate 620. A sheet of elastomeric membrane or material 663 is sandwiched between the concaved surfaces of body 610 and valve plate 620, forming diaphragm 630. Pressure (e.g., 35 psi) or vacuum (e.g., 10 Hg) can be applied to diaphragm 630 via valve control inlet 650 on valve plate 620 and flow passage 605 defined in valve plate 620 to close or open oblong diaphragm valve 600 as described above.

As illustrated in FIG. 6, distorted, oblong shaped O-ring 662 may be seated in oblong sealing channel or groove 660 defined in valve plate 620. Oblong sealing channel 660 may be dimensioned to surround or otherwise accommodate valve chamber 640. A smaller, shallower oblong sealing channel or groove 664 may be defined in body 610. Like oblong sealing channel 660, oblong sealing channel 664 may be dimensioned to surround or otherwise accommodate valve chamber 640. When valve plate 620 is attached to body 610, distorted, oblong shaped O-ring 662 presses material 663 into oblong sealing channel 664, sealing oblong diaphragm valve 600. This creates a seal and fixes diaphragm 630 in place. Alternatively, oblong sealing channel 664 may be constructed to receive distorted, oblong shaped O-ring 662 and oblong sealing channel or groove 660 defined in valve plate 620 may be smaller and/or shallower than oblong sealing channel 664. When valve plate 620 and body 610 are joined and secured to each other, distorted, oblong shaped O-ring 662 presses material 663 into oblong sealing channel 660, sealing oblong diaphragm valve 600 and fixing diaphragm 630 in place.

FIG. 7A depicts a diagrammatic representation illustrating example flow patterns produced by circular diaphragm valves 760, 762 in a pumping system. Each of circular diaphragm valves 760, 762 can be similar to a circular diaphragm valve described above. As illustrated in FIG. 7A, each valve chamber has a circular cross-sectional profile. When a circular diaphragm valve is opened, a fluid generally flows from an inlet (e.g., inlet 751) to an outlet (e.g., outlet 753). However, flow patterns (e.g., 796, 798) vary greatly, depending upon where the inlet and outlet ports are positioned in the circular valve chamber.

FIG. 7B depicts a diagrammatic representation of example flow pattern 799 produced by oblong diaphragm valve 710 according to some embodiments. Oblong diaphragm valve 710 can be similar to an oblong diaphragm valve described above, although the structure details are not shown here for the sake of clarity. As illustrated in FIG. 7B, the valve chamber of oblong diaphragm valve 710 has a non-circular cross-sectional profile defined by a length (L) and a width (W). While L can be approximately the same as the diameter (D) of circular diaphragm valve 760, W is significantly less than L. When oblong diaphragm valve 710 is opened, this width constrains the flow and forces the fluid to flow directly or generally directly from inlet 701 to outlet 703, producing a directed, more elongated flow pattern 799 that is significantly more efficient than circular flow patterns such as those flow patterns 798, 796 shown in FIG. 7A. As can be seen in FIG. 7B, flow lines of flow pattern 799 are tightly spaced and substantially parallel. This efficiency can reduce the displacement volume as well as fluid stagnation, among other benefits described above.

By comparison, flow lines of flow patterns 798, 796 shown in FIG. 7A are less compact and not well organized. Additionally, some areas of flow patterns 798, 796 show very little flow, which can lead to fluid stagnation. Stagnant fluid may gel or otherwise degrade over time, which may cause defects in a finished product.

Figure 8B:
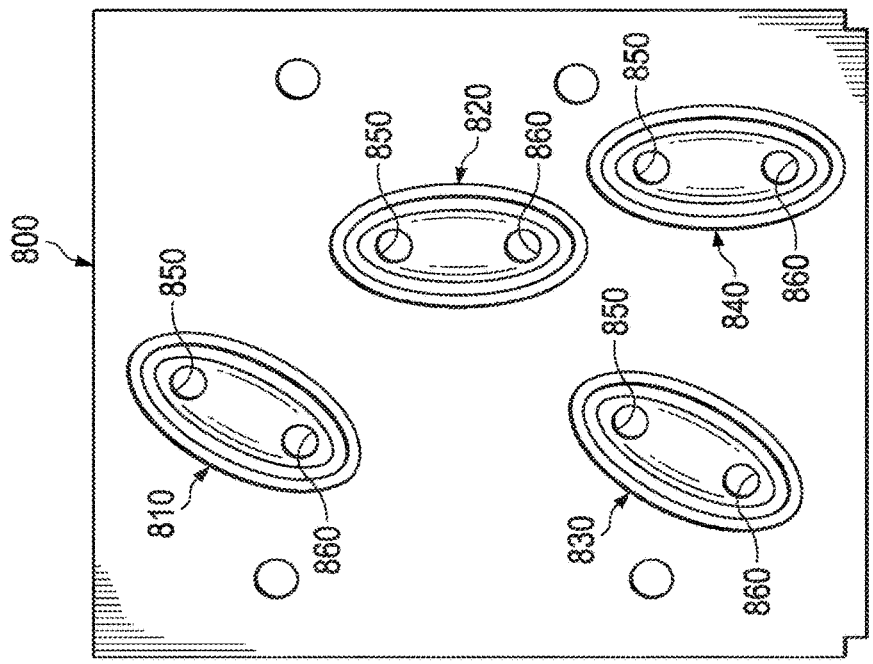
FIG. 8B depicts a diagrammatic representation of oblong diaphragm valves defined on an end surface of a body according to some embodiments.
Figure 8A:
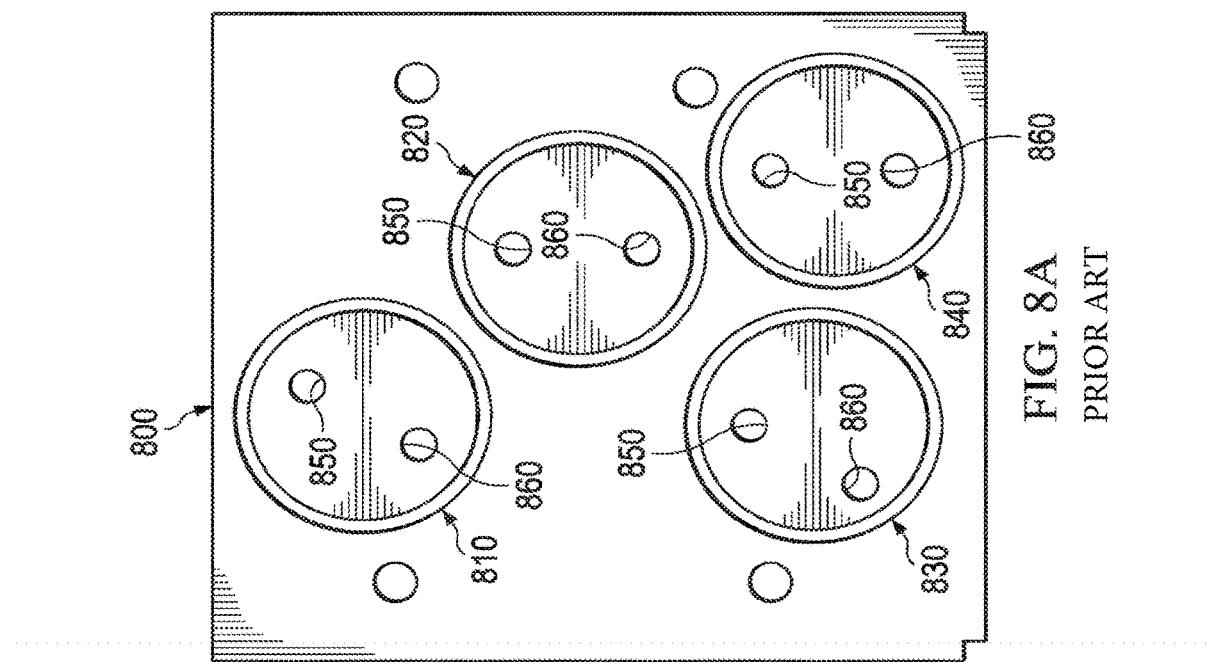
FIG. 8A depicts a diagrammatic representation of circular diaphragm valves defined on an end surface of a dispense block.

As another non-limiting example, FIG. 8A depicts a diagrammatic representation of circular diaphragm valves defined on an end surface of body 800 such as a dispense block. These circular diaphragm valves may function as purge valve 810, isolate valve 820, barrier valve 830, and inlet valve 840, each of which has ports 850, 860 defined in body 800. In this example, port 850 may connect to an inlet and port 860 may connect to an outlet of a circular diaphragm valve.

FIG. 8B depicts a diagrammatic representation of oblong diaphragm valves defined on the end surface of body 800, illustrating a significantly greater flexibility in structuring body 800 with purge valve 810, isolate valve 820, barrier valve 830, and inlet valve 840 in place of the circular diaphragm valves shown in FIG. 8A. For example, different configurations of body 800 are now possible without even needing to alter the size(s) and/or positions of ports 850, 860 defined in body 800. This is possible because the oblong diaphragm valves of FIG. 8B take up much less space on body 800 than the circular diaphragm valves shown in FIG. 8A, providing an opportunity (which does not exist with circular diaphragm valves) to add one or more oblong diaphragm valves. Furthermore, the inlets and outlets may be positioned in a more advantageous manner, such as by aligning each outlet vertically over or above a corresponding inlet (e.g., port 860 may now connect to an inlet and port 850 may now connect to an outlet of an oblong diaphragm valve). This arrangement allows any bubbles or microbubbles in a fluid flowing from the inlet to the outlet to rise up naturally. Such an arrangement may also reduce the necessary form factor for body 800. Reducing the form factor of body 800 may reduce cost, reduce wasted fluid, and/or improve performance.

Figure 9:
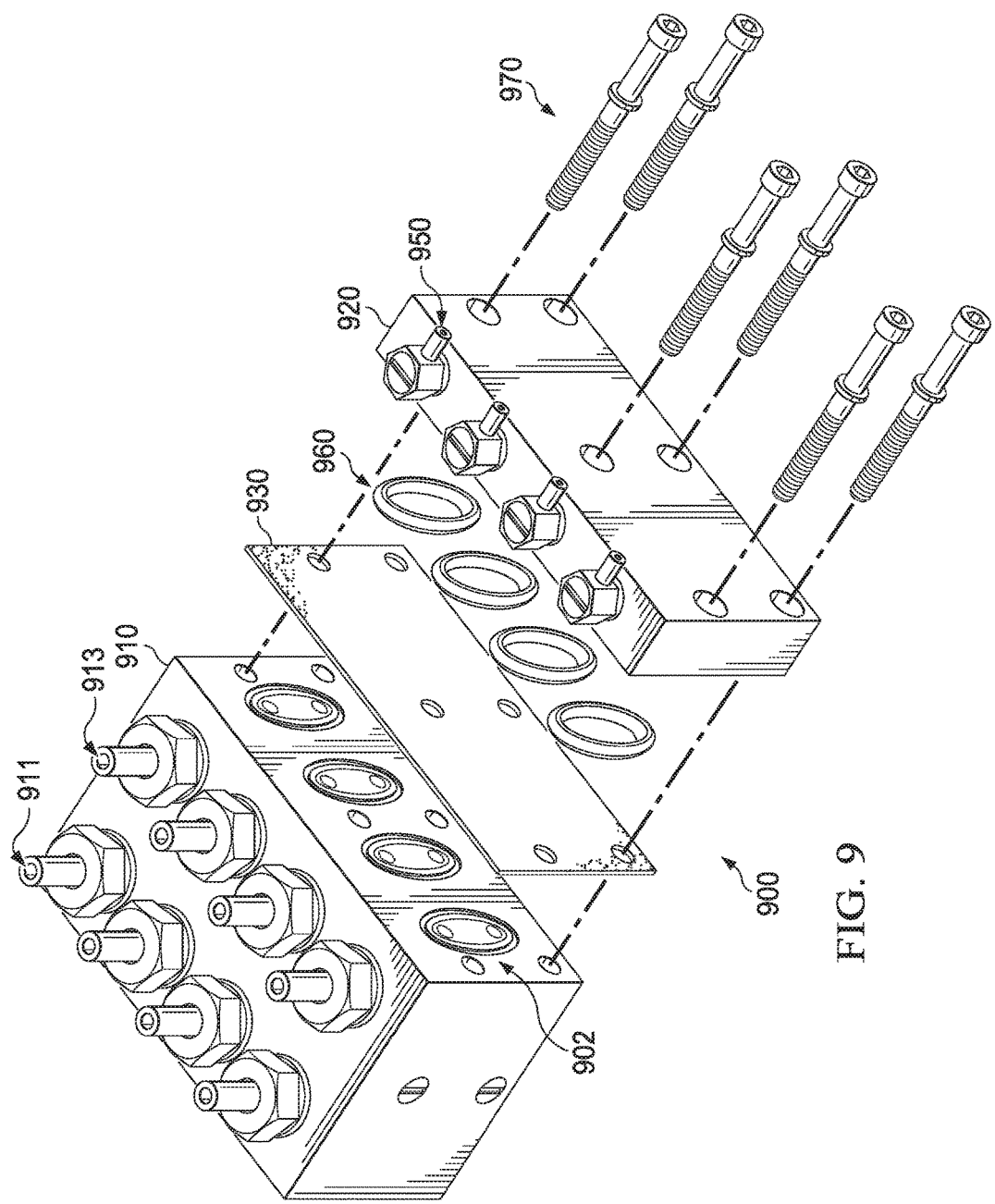
FIG. 9 depicts a diagrammatic representation of an exploded view of an example system having a plurality of oblong diaphragm valves according to some embodiments.

Other implementations may also be possible. For example, FIG. 9 depicts a diagrammatic representation of an exploded view of example system 900 having a plurality of oblong diaphragm valves 902 according to some embodiments. Each oblong diaphragm valve 902 may be similar to an oblong diaphragm valve described above.

In the example of FIG. 9, valve plate 920 is mounted onto body 910 via mounting screws 970, with a single piece of material 930 sandwiched between them to form multiple diagrams. Each oblong diaphragm valve 902 may include O-ring 960 and corresponding sealing channels or grooves for sealing and fixing a diaphragm in place, as described above. Ports 911, 913 on body 910 may connect to the inlets and the outlets of oblong diaphragm valves 902 individually, providing fluid connections with components external to system 900. In some embodiments, system 900 may be part of a larger system such as a high precision pump useful in semiconductor manufacturing processes.

Furthermore, valve control inlets 950 may connect flow passages defined in valve plate 920 to non-circular valve chambers of oblong diaphragm valves 902. As described above, the non-circular valve chambers of oblong diaphragm valves 902 may be defined by double concavity formed by concaved end surfaces defined on body 910 and valve plate 920. As shown in FIG. 9, each oblong diaphragm valve 902 may have an inlet positioned directly below an outlet so that fluid flow is oriented generally upwards from the inlet to the outlet. While the inlet and the outlet may be positioned at opposite ends of the non-circular valve chamber, the space or distance between the inlet and the outlet may be minimized to further reduce the size of the non-circular valve chamber needed to connect (when oblong diaphragm valve 902 is opened) and disconnect (when oblong diaphragm valve 902 is closed) them.

Although specific embodiments have been described, these embodiments are merely illustrative, and not restrictive of the invention. The description herein of illustrated embodiments of the invention, including the summary and the abstract, is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function.

While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. An oblong diaphragm valve, comprising:
    a valve body having a first half and a second half, the first half of the valve body having a first depression defined in a face of a dispense block, the second half of the valve body having a second depression defined in a face of a valve plate, the first depression and the second depression having a same or substantially same depth and having a same or substantially same oblong shape, the oblong shape having a length and a width, the length greater than the width;

a valve chamber having a volume defined by the first depression and the second depression in the first half and the second half of the valve body, the valve chamber having a first end and a second end defined by the length of the oblong shape;

an inlet defined in the first half of the valve body and proximal to the first end of the valve chamber for directing a fluid into the valve chamber;

an outlet defined in the first half of the valve body and proximal to the second end of the valve chamber for directing the fluid out of the valve chamber;

a diaphragm sandwiched between the first half and the second half of the valve body;

a flow passage defined in the second half of the valve body and having an opening centrally located relative to the valve chamber for actuation of the diaphragm to close or open the oblong diaphragm valve a distorted, oblong shaped O-ring;

a first sealing channel or grove defined in the first half of the body, the first sealing channel or grove having an oblong, elongated, elliptical, or non-circular shape surrounding the first depression in the first of the valve body;

a second sealing channel or groove defined in the second half of the valve body, the second sealing channel or groove having an oblong, elongated, elliptical, or non-circular shape surrounding the second depression in the second half of the valve body.

2. The oblong diaphragm valve of claim 1, wherein the first sealing channel or groove is dimensioned to receive the distorted, oblong shaped O-ring therein and wherein when the first half and the second half of the valve body are joined and secured to each other, the distorted, oblong shaped O-ring presses the diaphragm into the second sealing channel or groove defined in the second half of the valve body such that a seal is created and the diaphragm is fixed in place.

3. The oblong diaphragm valve of claim 1, wherein the second sealing channel or groove is dimensioned to receive the distorted, oblong shaped O-ring therein and wherein when the first half and the second half of the valve body are joined and secured to each other, the distorted, oblong shaped O-ring presses the diaphragm into the first sealing channel or groove defined in the first half of the valve body such that a seal is created and the diaphragm is fixed in place.

4. The oblong diaphragm valve of claim 1, wherein the depth is dependent upon at least one of:
- an amount of vacuum or pressure required to fully displace the diaphragm in the valve chamber;
- an extent of expected stress on the diaphragm during operation of the oblong diaphragm valve;
- a temperature or range of temperatures having an effect on the diaphragm;
- a dispense volume;
- an expected failure rate for the diaphragm;
- an expected lifespan of the diaphragm;
- a diameter of the inlet;
- a diameter of the outlet; or
- a viscosity of the fluid.

5. The oblong diaphragm valve of claim 1, wherein the first depression defines a seat having a concaved surface against which the diaphragm adapts to match with minimal or no stress when pressure is applied via the flow passage and the opening defined in the second half of the valve body to close the oblong diaphragm valve.

6. The oblong diaphragm valve of claim 1, wherein the second depression defines a seat having a concaved surface against which the diaphragm adapts to match with minimal or no stress when vacuum is applied via the flow passage and the opening defined in the second half of the valve body to open the oblong diaphragm valve and allow the fluid to flow from the inlet to the outlet.

7. The oblong diaphragm valve of claim 1, wherein the valve chamber has a cross-sectional profile of a non-circular shape with no corners or diverging lines.

8. The oblong diaphragm valve of claim 1, wherein the dispense block, the valve plate, and the oblong diaphragm valve there-between are in a pump.

9. A system, comprising:
a body having a first end face;
a plate having a second end face; and
an oblong diaphragm valve having:
a first part and a second part, the first part of the oblong diaphragm valve having a first curved surface carved into the first end face of the body, the second part of the oblong diaphragm valve having a second curved surface carved into the second end face of the plate, the first curved surface and the second curved surface having a same or substantially depth and having a same or substantially same oblong shape, the oblong shape having a length and a width, the length greater than the width;

a valve chamber having a volume defined by the first curved surface and the second curved surface in the first part and the second part of the oblong diaphragm valve, the valve chamber having a first end and a second end defined by the length of the oblong shape;

an inlet defined in the first part of the oblong diaphragm valve and proximal to the first end of the valve chamber for directing a fluid into the valve chamber;

an outlet defined in the first half of the oblong diaphragm valve and proximal to the second end of the valve chamber for directing the fluid out of the valve chamber;

a diaphragm sandwiched between the first part and the second part of the oblong diaphragm valve;

a flow passage defined in the second part of the oblong diaphragm valve and having an opening centrally located relative to the valve chamber for actuation of the diaphragm to close or open the oblong diaphragm valve a distorted, oblong shaped O-ring;

a first sealing channel or groove defined in the first part of the oblong diaphragm valve, the first sealing channel or groove having an oblong, elongated, elliptical, or non-circular shape surrounding the first curved surface in the first part of the oblong diaphragm valve; and a second sealing channel or groove defined in the second part of the oblong diaphragm valve, the second sealing channel or groove having an oblong, elongated, elliptical, or non-circular shape surrounding the second curved surface in the second part of the oblong diaphragm valve.

10. The system of claim 9, wherein the first sealing channel or groove is dimensioned to receive the distorted, oblong shaped O-ring therein and wherein when the first part and the second part of the oblong diaphragm valve are joined and secured to each other, the distorted, oblong shaped O-ring presses the diaphragm into the second sealing channel or groove defined in the second part of the oblong diaphragm valve such that a seal is created and the diaphragm is fixed in place.

11. The system of claim 9, wherein the second sealing channel or groove is dimensioned to receive the distorted, oblong shaped O-ring therein and wherein when the first part and the second part of the oblong diaphragm valve are joined and secured to each other, the distorted, oblong shaped O-ring presses the diaphragm into the first sealing channel or groove defined in the first part of the oblong diaphragm valve such that a seal is created and the diaphragm is fixed in place.

12. The system of claim 9, wherein the depth is dependent upon at least one of:
   an amount of vacuum or pressure required to fully displace the diaphragm in the valve chamber;
   an extent of expected stress on the diaphragm during operation of the oblong diaphragm valve;
   a temperature or range of temperatures having an effect on the diaphragm;
   a dispense volume;
   an expected failure rate for the diaphragm;
   an expected lifespan of the diaphragm;
   a diameter of the inlet;
   a diameter of the outlet; or
   a viscosity of the fluid.

13. The system of claim 9, wherein the first curved surface defines a seat against which the diaphragm adapts to match with minimal or no stress when pressure is applied via the flow passage and the opening defined in the second part of the oblong diaphragm valve to close the oblong diaphragm valve.

14. The system of claim 9, wherein the second curved surface defines a seat against which the diaphragm adapts to match with minimal or no stress when vacuum is applied via the flow passage and the opening defined in the second part of the oblong diaphragm valve to open the oblong diaphragm valve and allow the fluid to flow from the inlet to the outlet.

15. The system of claim 9, wherein the valve chamber has a cross-sectional profile of a non-circular shape with no corners or diverging lines.

16. The system of claim 9, wherein the body is part of a dispense block in a pump, wherein the plate comprises a valve plate, and wherein the second end face of the valve plate is structured to couple to the first end face of the dispense block such that the diaphragm is sandwiched between the first part and the second part of the oblong diaphragm valve.

* * * * *